(No Model.)
L. C. HUBER.
WEIGHT MOTOR FOR BLOWERS OF CARBURETORS.
No. 503,702.   Patented Aug. 22, 1893.
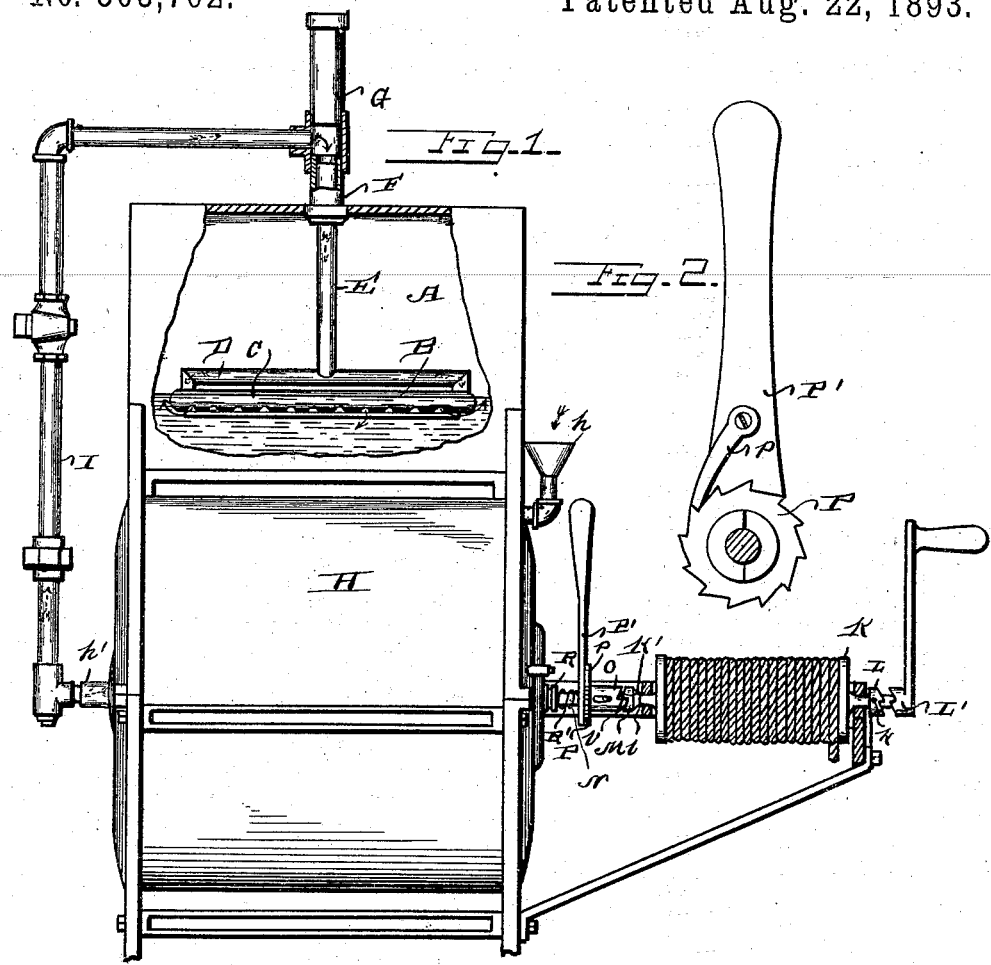
WITNESSES
Jesse Heller.
Philip C. Masi.
INVENTOR
L. C. Huber
by E. W. Anderson
his Attorney

UNITED STATES PATENT OFFICE.

LOUIS C. HUBER, OF LOUISVILLE, KENTUCKY.

WEIGHT-MOTOR FOR BLOWERS OF CARBURETORS.

SPECIFICATION forming part of Letters Patent No. 503,702, dated August 22, 1893.

Application filed November 16, 1892. Serial No. 452,198. (No model.)

*To all whom it may concern:*

Be it known that I, LOUIS C. HUBER, a citizen of the United States, and a resident of Louisville, in the county of Jefferson and State of Kentucky, have invented certain new and useful Improvements in Weight-Motors for Carburetor-Blowers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation, partly in section, showing the invention as applied to the blower of a carburetor. Fig. 2 is a detail view of the lever P'.

The invention has relation to certain new and useful improvements in weight motors for carburetor blowers, the object being to provide means whereby the winding and unwinding of the weight may be accomplished in such a manner as to maintain a constant supply of air to the carburetor, and a constant pressure of vapor at the burners; and the invention consists in the novel construction and combination of parts, all as hereinafter specified, and pointed out in the claims.

In the accompanying drawings showing the invention applied to a carburetor and its blower, the letter A designates the carburetor, and C the float therein, said float having the perforated air pipe c, the pipe D, and the telescopic air supply pipes E and G. H is the blower case, having the water bill h, and the air outlet h'.

K designates the spool or drum of the motor, and K' the spool or drum shaft, which is provided with bearings in a bracket extension of the blower case. Secured to the outer end portion of said shaft by a pin k is a clutch section L, which is designed to be engaged by a corresponding section L' of the crank. When the crank is turned in the right direction, the clutch sections engage each other, and the weight is wound. If through carelessness, the winding is attempted in the wrong direction, it results in a disengagement of the clutches, and no harm is done to the mechanism by turning it backward or forcing it on itself.

Again, if the crank is thoughtlessly left on after winding, the first revolution of the gearing will result in throwing the crank off the end of the shaft. The spool shaft ends at l, and on the end portion thereof is a clutch section M, the clutch teeth of which are the reverse of those on the section L.

N is the blower shaft which extends through the case, in alignment with the spool shaft, and terminates at l'. On the end portion of this extension is a clutch section O, having a slot on either side and a pin passing through the slot and shaft, said pin being fast on the shaft but working loosely in the slot so as to permit the clutch section to move to and from the section on the spool shaft. On one end of the slotted clutch section is secured a ratchet wheel P, and adjacent thereto is a lever P', through the lower end of which the blower shaft loosely passes, said lever carrying a pawl p, which is designed to engage the ratchet wheel. Seated around the shaft between the lower end of said lever, and a stuffing box R, through which the shaft passes, is a spring R', the tension of which normally holds the clutch sections M and O in engagement, and serves to throw the section O back into engagement after winding ceases. The purpose of the lever P' is to keep the blower in operation during the process of winding, by throwing the pawl p into engagement with the ratchet P, and pulling in the direction of the rotation of the blower, thereby keeping the pressure on and the lights or fires going, should it at any time be necessary to rewind while the device is in operation. But for this provision a sucking action would be caused by the winding, which would extinguish the lights or fires.

Having described this invention, what I claim, and desire to secure by Letters Patent, is—

1. In a weight motor for the blowers of carburetors the combination of the spool and spool shaft, the clutch section fast on the outer end portion of said shaft, the crank having a clutch section loose on said shaft, the reverse clutch section on the opposite end portion of said shaft, the blower shaft, having an extension in alignment with said spool shaft the sliding clutch section thereon, the ratchet on said clutch section, and the pawl lever loose on said shaft extension, substantially as specified.

2. In a weight motor for the blowers of carburetors, the combination with the blower shaft extension, of the spool shaft and spool, the winding crank having a clutch connection with said spool shaft, the reverse clutch section on the opposite end of said spool shaft, the sliding clutch section on the blower shaft extension designed to engage said reverse clutch section, the spring for normally holding said sections in engagement, the ratchet wheel on said sliding clutch section, the lever through the lower end of which the shaft extension loosely passes, and the pawl on said lever adapted to engage said ratchet wheel, substantially as specified.

In testimony whereof I affix my signature in presence of two witnesses.

L. C. HUBER.

Witnesses:
C. L. REVENAUGH,
JOHN M. GOWAN.